United States Patent [19]
Silva et al.

[11] Patent Number: 5,603,864
[45] Date of Patent: Feb. 18, 1997

[54] METHOD FOR THE PREPARATION OF VISCOUS HYDROCARBON IN AQUEOUS BUFFER SOLUTION EMULSIONS

[75] Inventors: Felix Silva, Edo Miranda; Hercilio Rivas; Gustavo Nunez, both of Caracas; Dolores Pazos, Edo Miranda, all of Venezuela

[73] Assignee: Intevep, S.A., Caracas, Venezuela

[21] Appl. No.: 355,440

[22] Filed: Dec. 13, 1994

Related U.S. Application Data

[63] Continuation-in-part of Ser. No. 413, Jan. 4, 1993, Pat. No. 5,480,583, which is a continuation-in-part of Ser. No. 801,472, Dec. 2, 1991, Pat. No. 5,419,852.

[51] Int. Cl.[6] .................. B01J 13/00; C10L 1/32; F17D 1/17
[52] U.S. Cl. .............. 252/311.5; 252/312; 252/314; 44/301; 137/13
[58] Field of Search .................. 252/311.5, 312, 252/314; 44/301; 137/13

[56] References Cited

U.S. PATENT DOCUMENTS

| | | | |
|---|---|---|---|
| 3,380,531 | 4/1968 | McAuliffe et al. | 166/371 |
| 3,487,844 | 1/1970 | Simon et al. | 137/13 |
| 3,526,839 | 6/1996 | Padron | 252/312 |
| 4,801,304 | 1/1989 | Polanco et al. | 44/301 |
| 5,283,001 | 2/1994 | Gregoli et al. | 252/314 |
| 5,354,504 | 10/1994 | Rivas et al. | 252/314 |
| 5,419,852 | 5/1995 | Rivas et al. | 252/312 |
| 5,480,583 | 1/1992 | Rivas et al. | 252/311.5 |

*Primary Examiner*—Richard D. Lovering
*Assistant Examiner*—Daniel S. Metzmaier
*Attorney, Agent, or Firm*—Bachman & LaPointe, P.C.

[57] ABSTRACT

A method for forming a stable bimodal emulsion comprises admixing a viscous hydrocarbon with an aqueous buffer solution under controlled conditions so as to obtain a first monomodal emulsion having an average hydrocarbon droplet size of less than 5 microns. The monomodal emulsion is thereafter diluted with water and additional viscous hydrocarbon is admixed with the diluted monomodal emulsion under a second mixing energy sufficient to produce a bimodal emulsion wherein the average small hydrocarbon droplet size is less than or equal to 5 microns and the average large hydrocarbon droplet size is less than or equal to about 30 microns.

19 Claims, 6 Drawing Sheets

METHOD FOR THE PREPARATION OF VISCOUS HYDROCARBON IN AQUEOUS BUFFER SOLUTION EMULSIONS

CROSS-REFERENCE RELATED APPLICATIONS

This application is a continuation-in-part of U.S. patent application Ser. No. 08/000,413, filed Jan. 4, 1993, now U.S. Pat. No. 5,480,583, issued Jan. 2, 1996, which is a continuation-in-part of Ser. No. 07/801,472, filed Dec. 2, 1991, now U.S. Pat. No. 5,419,852.

BACKGROUND OF THE INVENTION

The present invention relates to a method for the formation of viscous hydrocarbon in aqueous buffer solution emulsions and, more particularly, a method for the preparation of bimodal emulsions of viscous hydrocarbon in aqueous buffer solution which are used as combustible fuels.

Low gravity viscous hydrocarbons are found in large supply in Canada, Russia, the United States, China and Venezuela, and are normally liquids with viscosities ranging from 10,000 cp to more than 500,000 cp at ambient temperatures. These hydrocarbons are typically produced by numerous methods including steam injection, mechanical pumping, mining techniques and combinations of these methods.

Once produced, such hydrocarbons are useful as combustible fuel once they are desalted and dehydrated and have been treated to remove other undesirable constituents. As a liquid fuel, however, these hydrocarbons are too viscous for practical use. Thus, such viscous hydrocarbons are formed into hydrocarbon in water emulsions which have improved viscosity and, accordingly, improved flow characteristics. When formed with a high ratio of hydrocarbon material to water, these emulsions are an excellent combustible fuel. However, the emulsion is not stable and rapidly breaks if not stabilized with surfactants or emulsifiers. Unfortunately, commercial emulsifiers are expensive and the cost of the emulsion is therefore increased. This added cost obviously adversely impacts the viability of using viscous hydrocarbons to form combustible fuel emulsions.

Viscous hydrocarbons are known to naturally contain materials which are potential surfactants. It would of course be desirable to activate such materials so as to provide natural surfactants to stabilize the emulsion without the additional expense of commercial emulsifiers, thereby providing a more practical alternative for the use of viscous hydrocarbons in forming combustible fuel emulsions. The materials naturally contained in viscous hydrocarbons which are potential surfactants include numerous carboxylic acids, esters and phenols which, in basic pH environment, can be activated as natural surfactants. Sodium hydroxide has been used as an additive to provide the proper pH. However, sodium hydroxide is unable to keep the pH of the aqueous phase constant so that the proper pH, the activated surfactant and the emulsion itself are all short lived.

Naturally, it is highly desirable to provide a method for forming stable emulsions which employ the natural surfactants present in the viscous hydrocarbons discussed above.

Accordingly, it is the principle object of the present invention to provide a method for the preparation of emulsions of viscous hydrocarbons in water which utilizes the natural surfactants present in the viscous hydrocarbons to provide stability to the emulsion.

It is a still further object of the present invention to provide a method as aforesaid which is particularly useful for forming bimodal emulsions.

It is a still further object of the present invention to provide a method as aforesaid whereby the emulsion is capable of being used as a combustible fuel.

Other objects and advantages of the present invention will appear hereinbelow.

SUMMARY OF THE INVENTION

In accordance with the present invention the foregoing objects and advantages are readily obtained.

The present invention comprises a method for forming stable mono-modal or bimodal emulsions, preferably bimodal emulsions, of viscous hydrocarbons in aqueous buffer solutions. In accordance with the present invention a viscous hydrocarbon containing an inactive surfactant is mixed with an aqueous buffer solution under controlled conditions so as to form a mono-modal emulsion. The aqueous buffer solution comprises water, an alkali additive in an amount of greater than or equal to about 30 ppm and a buffer additive in an amount of greater than or equal to about 4,000 ppm wherein the pH of the aqueous buffer solution is greater than or equal to about 11. The viscous hydrocarbon is mixed with the aqueous buffer solution at a mixing energy sufficient to form a mono-modal emulsion of the viscous hydrocarbon in aqueous buffer solution wherein the average hydrocarbon droplet size in the mono-modal emulsion is less than or equal to 5 microns. The buffer additive in the aqueous buffer solution extracts the inactive natural surfactant from the viscous hydrocarbon so as to stabilize the mono-modal emulsion. A bimodal emulsion may then be formed in accordance with the present invention by diluting the mono-modal emulsion and thereafter mixing additional viscous hydrocarbon with the diluted mono-modal emulsion at a preferred mixing rate sufficient to form a stable bimodal emulsion of the viscous hydrocarbon in the aqueous buffer solution. In accordance with the invention, the resulting bimodal emulsion is a stable emulsion having a hydrocarbon to aqueous buffer solution ratio of between about 60:40 to 80:20, an average small hydrocarbon droplet size ($D_S$) of less than or equal to about 5 microns and an average large hydrocarbon droplet size ($D_L$) of less than or equal to about 30 microns.

In accordance with the present invention, the buffer additive used in the aqueous buffer solution is a water soluble amine present in a concentration of between about preferably 4,000 ppm to about 15,000 ppm.

The method of the present invention allows for the formation of stable, bimodal emulsions by an energy efficient method which is superior to methods heretofore known.

DETAILED DESCRIPTION

The present invention relates to a method for the formation of viscous hydrocarbon in aqueous buffer solution emulsions and, more particularly, a method for the preparation of bimodal emulsions of viscous hydrocarbon in aqueous buffer solution which are used as combustible fuels.

The naturally occurring viscous hydrocarbon materials usefully employed in the process of the present invention are characterized by the following chemical and physical properties.

TABLE 1

Characteristics Viscous Hydrocarbon

| | |
|---|---|
| Carbon | 78–85% |
| Hydrogen | 9.0–11.0% |
| Sulfur | 2.0–4.5% |
| Nitrogen | 0.5–0.7% |
| Ash | 0.05–0.3% |
| Oxygen | 0.2–1.3% |
| V | 50–1,000 ppm |
| Ni | 20–500 ppm |
| Fe | 50–60 ppm |
| Na | 20–100 ppm |
| API | 5.0–10.0 |
| Total Acid Number (mg KOH/g) | 2.5–3.8 |
| Viscosity at 74° F. | 90,000–150,000 cst |
| Caloric content | 15,000–19,000 Btu/lb |
| Asphaltenes | 9.0–15.0% |

These naturally occurring viscous hydrocarbon materials contain inactive surfactants including carbosilic acids, phenols and esters which, under proper conditions, can be activated as surfactants.

In accordance with the present invention, a buffer additive in an aqueous buffer solution is used to extract the inactive natural surfactant in the viscous hydrocarbon so as to form a stabilized emulsion. In accordance with the present invention, the aqueous buffer solution comprises water, an alkali additive and a buffer additive wherein the aqueous buffer solution pH is controlled so as to be greater than or equal to about 11. The buffer additive employed in the aqueous solution is a water soluble amine. When forming a monomodal emulsion, it has been found that the buffer additive need be present in an amount of greater than or equal to 1,000 ppm. However, when forming a bimodal emulsion in accordance with the method of the present invention, the buffer additive must be present in an amount of greater than or equal to 4,000 ppm. The concentration of the buffer additive is preferably between 4,000 ppm and 15,000 ppm and ideally between 4,000 ppm and 10,000 ppm. The water soluble amine may have a single alkyl group or at least two alkyl groups. Particularly suitable water soluble amines for use in the method of the present invention include the following: ethylamine, diethylamine, triethylamine, n-butylamine, tri-isobutylamine, dimethylamine, methylamine, propylamine, dipropylamine, sec-propylamine, butylamine, sec-butylamine, and mixtures thereof.

In addition to the buffer additive, the aqueous buffer solution includes an alkali additive in an amount of greater than or equal to 30 ppm, preferably 30 ppm to 500 ppm, and ideally 30 ppm to 100 ppm. The use of the alkali additive in combination with the buffer additive results in a synergistic affect when employing the method of the present invention. When the alkali additive and buffer additive are used together, the mixing energies required to form emulsions having the desired droplet sizes are greatly reduced. Particularly suitable alkali additives for use in the aqueous buffer solution used in the method of the present invention include water soluble alkali metal salts, alkaline earth metal salts, alkali hydroxides, alkaline earth hydroxides, ammonium salts, alkyl ammonium hydroxides and mixtures thereof. Particularly useful alkali additives include sodium chloride, potassium chloride, sodium nitrate, potassium nitrate, sodium hydroxide, potassium hydroxide, calcium nitrate, calcium chloride, magnesium chloride, magnesium nitrate, ammonium chloride, ammonium hydroxide, tetrammonium hydroxide, tetrapropylammonium hydroxide and mixtures thereof.

The viscous hydrocarbon is then mixed with the aqueous buffer solution at a mixing rate sufficient to form a monomodal emulsion of the viscous hydrocarbon in the aqueous buffer solution wherein the average hydrocarbon droplet size is less than or equal to about 5 microns. The buffer additive in the aqueous buffer solution extracts the inactive natural surfactant from the viscous hydrocarbon so as to stabilize the emulsion. It has been found in accordance with the method of the present invention that a mixing energy of between about 60,000 and 200,000 $J/m^3$, preferably 60,000 to 150,000 $J/m^3$ is required to form the mono-modal emulsion having the desired oil droplet size.

In order to form a bimodal emulsion, the mono-modal emulsion is diluted by adding water and thereafter additional viscous hydrocarbon is mixed with the diluted mono-modal emulsion at a mixing rate sufficient to form a stable bimodal emulsion having the following physical and chemical properties. A hydrocarbon to aqueous buffer solution ratio of between 60:40 to 80:40, an average small hydrocarbon droplet size ($D_S$) of less than or equal to about 5 microns, an average large hydrocarbon droplet size ($D_L$) of less than or equal to about 30 microns, a ratio of ($D_L$) to ($D_S$) of greater than or equal to about 4, preferably greater than or equal to about 10 wherein 70–90% by weight of the viscous hydrocarbon is contained in the large droplet size ($D_L$). In accordance with the present invention it has been found that the mixing energy required to obtain the bimodal emulsion defined above is about between 80,000 to 1,000,000 $J/m^3$, preferably between about 80,000 to about 800,000 $J/m^3$. The viscosity of the resulting bimodal emulsion is less than or equal to about 500 cp at 30° C. and 1 $S^{-1}$.

Figure 1:
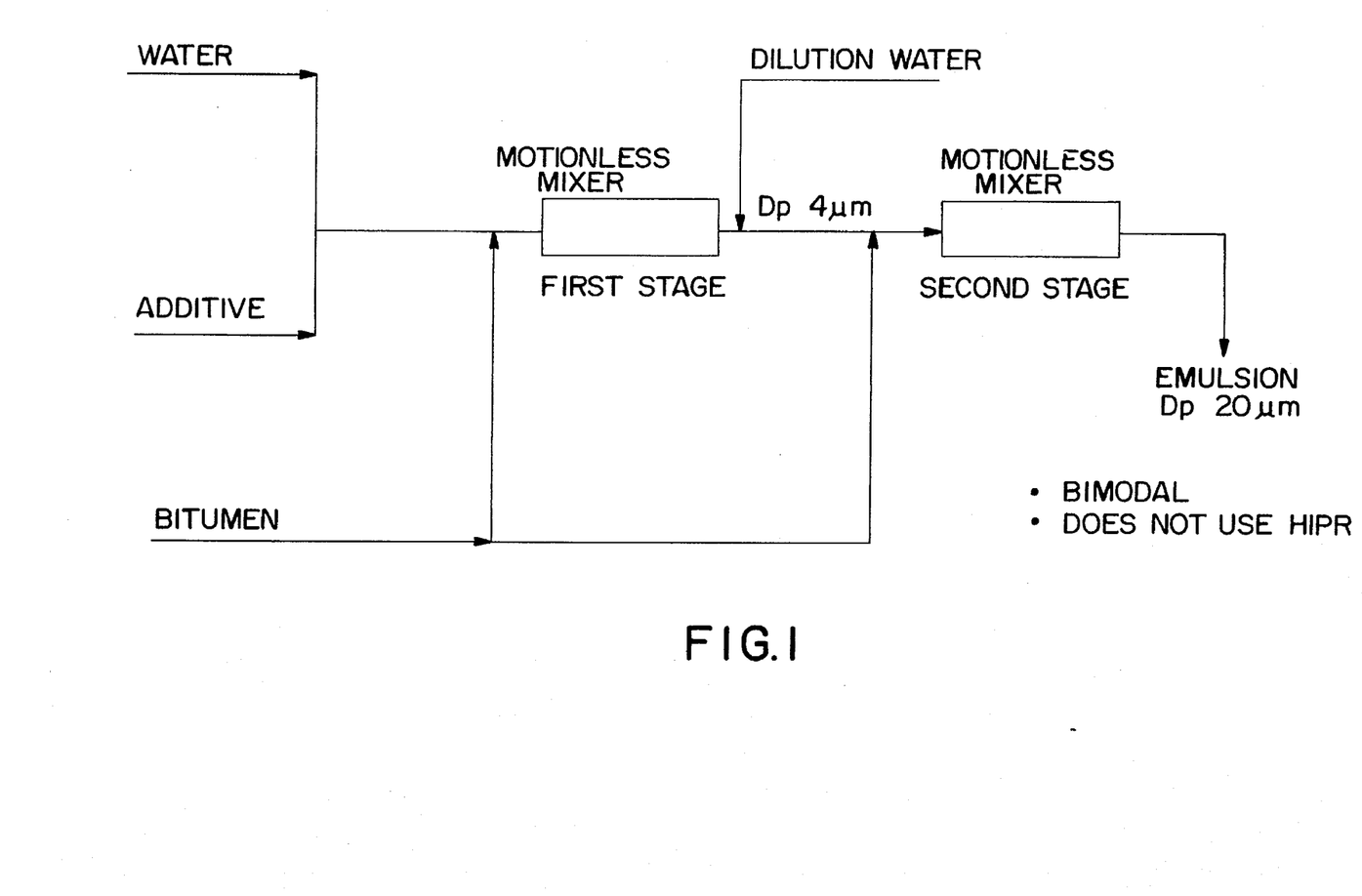
FIG. 1 is a flow diagram illustrating the method for producing bimodal emulsion in accordance with the present invention.

Figure is a schematic diagram illustrating the method of the present invention. With reference to FIG. 1, a water and a buffer additive are mixed so as to form the aqueous buffer solution. Bitumen is then added to the aqueous buffer solution and mixed in a first stage mixer so as to form a monomodal emulsion. The monomodal emulsion of the first stage is thereafter diluted with water and additional bitumen is added to the diluted monomodal emulsion. The mixture is thereafter sent to a second stage where mixing energy is imparted so as to form a resulting bimodal emulsion product in accordance with the present invention.

The method of the present invention will be further illustrated by way of the following examples.

EXAMPLE 1

This example demonstrates the preparation of a stable bimodal in aqueous buffer solution emulsion in accordance with the present invention.

Figure 2:
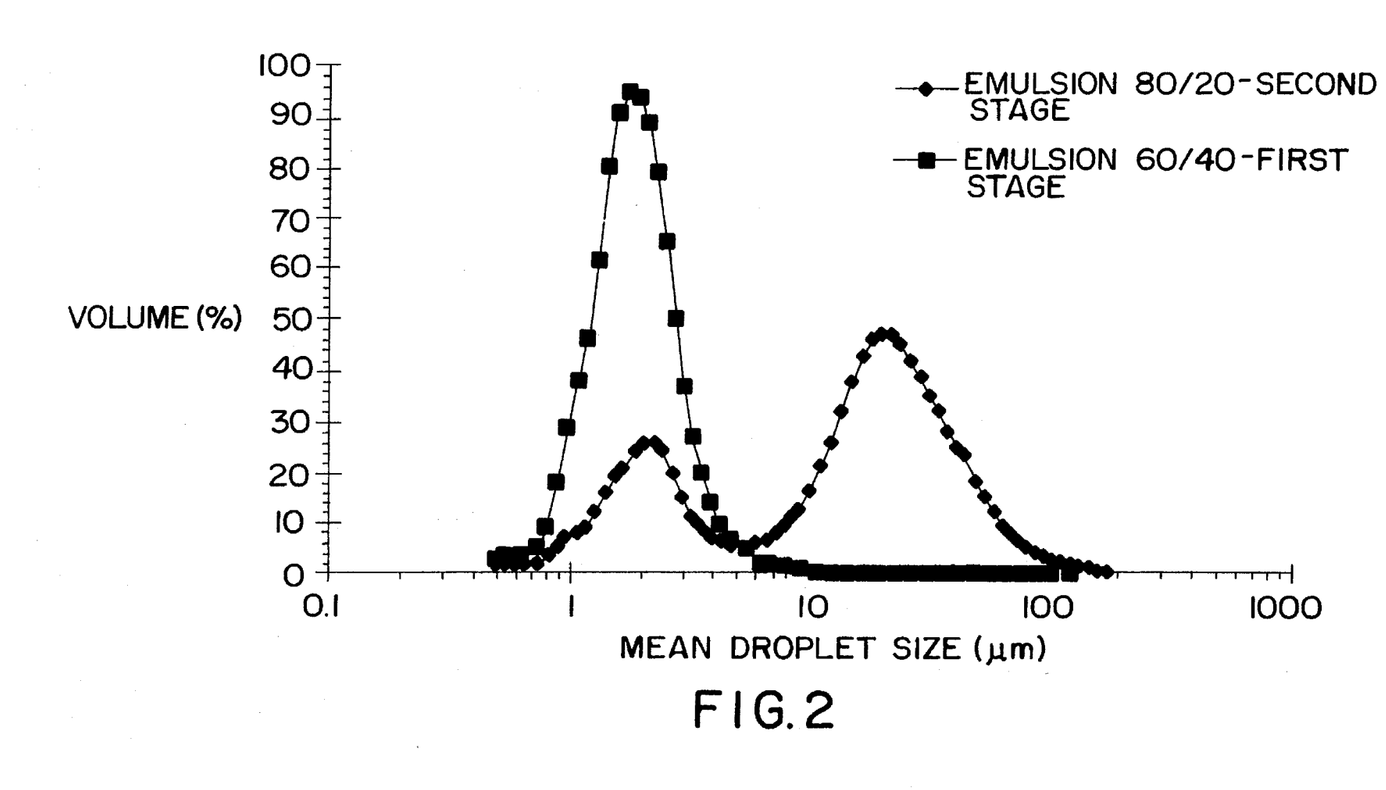
FIG. 2 is a graph illustrating the droplet size distribution obtained when producing a monomodal emulsion and bimodal emulsion in accordance with the method of the present invention.

An aqueous buffer solution was prepared containing 7,000 ppm ethylenediamine and 400 ppm of NaOH having a pH of about 11. A viscous hydrocarbon bitumen having the characteristics set forth in Table I was heated to about 70° C. and mixed with the buffer solution in a static mixer in accordance with the processing scheme shown in FIG. 1. The proportion of bitumen to aqueous buffer solution was set at 60:40. The SMX 40 static mixer was chosen with enough mixing elements so as to provide a mixing energy of about 80,000 $J/m^3$. The resulting mono-modal emulsion from the first stage had a particle size distribution as shown in FIG. 2. The average particle size was less than 2 μm with a bitumen to aqueous buffer solution ratio of 60:40. The monomodal emulsion was diluted with water so as to obtain a bitumen:dilute aqueous buffer solution of about 40:60. The dilute emulsion was mixed with additional bitumen at 70° C. in a second static mixer in the proportion of bitumen to dilute emulsion to obtain a 80:20 emulsion. The static mixer was chosen with enough mixing elements so as to provide a mixing energy of about 300,000 $J/m^3$. The emulsion that exited the second static mixer had a bimodal drop size distribution as shown in FIG. 2. The average diameter of the large drop population had a value of about 20 μm while the average diameter of the small drop population had a value of about 2 μm. The viscosity of this emulsion was about 450 cp at 30° C. and 1 $S^{-1}$.

EXAMPLE 2

This example demonstrates the synergistic effect of the alkali additive and the buffer additive in the mixing energy needed to obtain the desired average droplet diameter.

Emulsions were prepared using different amounts of alkali and buffer additives to activate the natural surfactants in the bitumen. The bitumen and buffer solution were mixed at a bitumen to buffer solution ratio of 60:40 using a mixer at a mixing energy of 120,000 $J/m^3$. The results of the droplet size obtained in the resulting monomodal emulsion are shown in Table II.

TABLE II

|  | NaOH (ppm) | Ethylenediamine (ppm) | Average Droplet Diameter (μm) |
| --- | --- | --- | --- |
| Emulsion A | 400 | 0 | >100 |
| Emulsion B | 0 | 7,000 | 47.8 |
| Emulsion C | 400 | 7,000 | 3.4 |

A smaller droplet size is obtained with the same mixing energy using the buffer solution containing both the buffer additive and the alkali additive than those obtained using buffer solution which contain either additive alone.

EXAMPLE 3

This example demonstrates the effect of the mixing energy on the formation of the bimodal emulsion in accordance with the method of the present invention.

The emulsions were prepared as described in Example 1 with the exception that a dynamic mixer was used to deliver the desired mixing energy to the mixing at stages 1 and 2 as shown in FIG. 1. As a control, a bimodal emulsion was prepared in accordance with U.S. Pat. No. 4,776,977 using the same mixer. The results are shown in FIGS. 3 and 4.

Figure 3:
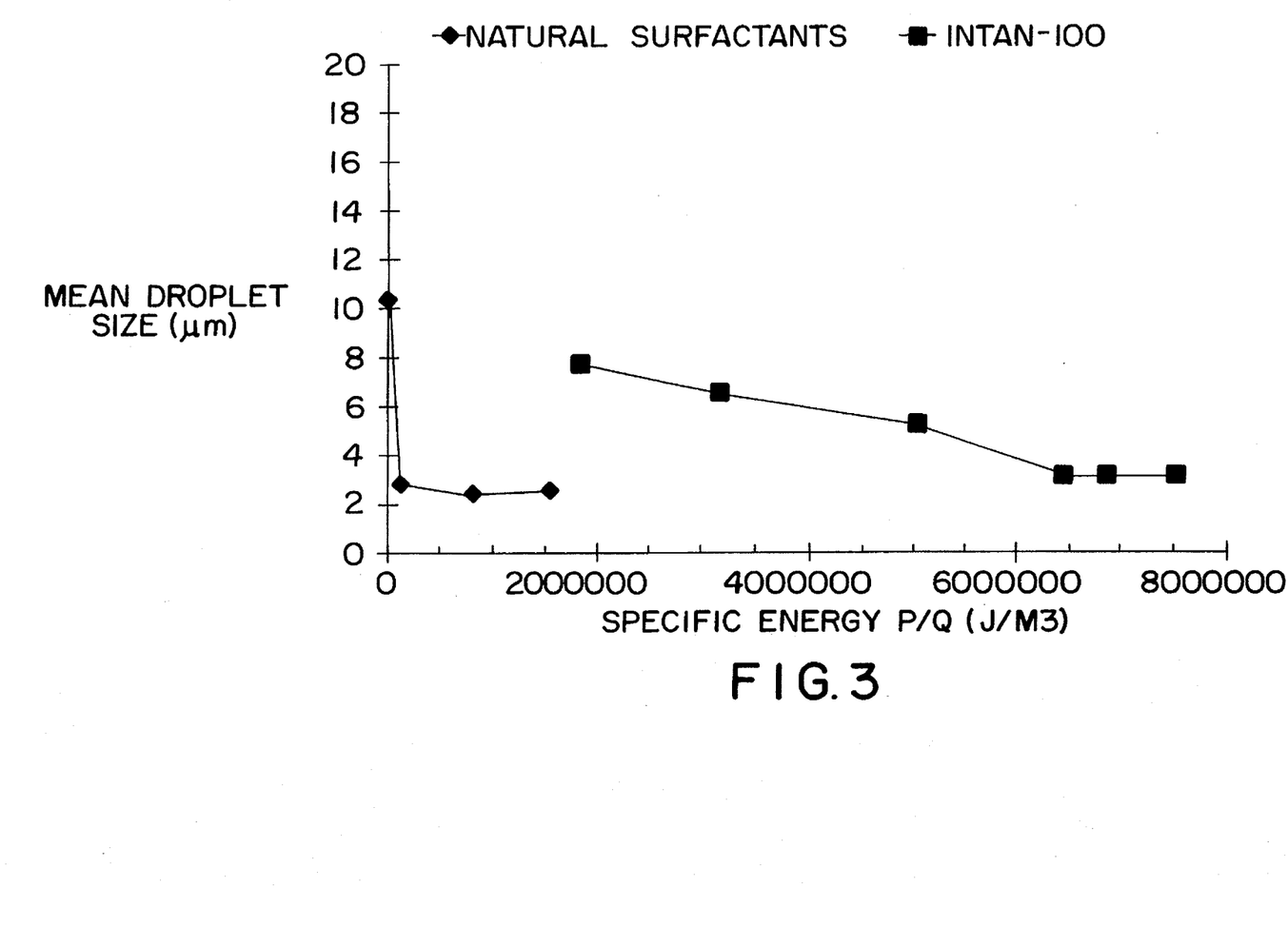
FIG. 3 is a graph illustrating the affect of mixing energy on droplet size in a monomodal emulsion formed in accordance with the present invention when compared to a prior art process.
Figure 4:
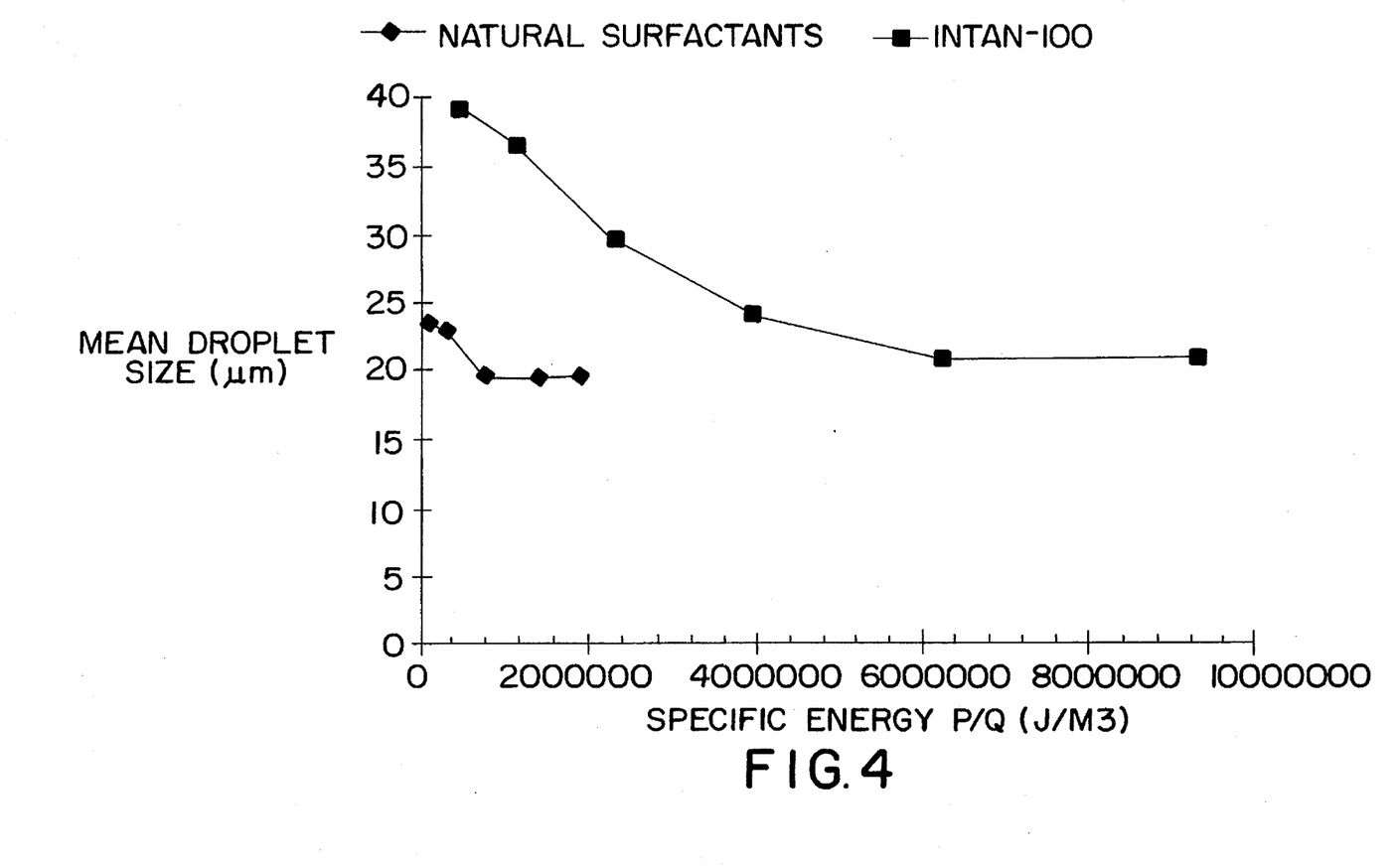
FIG. 4 is a graph illustrating the affect of mixing energy on droplet size in a bimodal emulsion formed in accordance with the present invention when compared to a prior art process.

As can be seen from FIGS. 3 and 4, the method of the present invention requires much less energy to form an emulsion with like particle size. For the small particle size emulsion, the novel procedure required 60 times less energy than that required in the method of U.S. Pat. No. 4,776,977. A similar result was obtained in the formation of the large diameter drop emulsion using the prior art process and the process of the invention. More than 10 times more energy was needed to obtain an emulsion with like average droplet size using a surfactant in the prior art method than the method of the present invention.

EXAMPLE 4

This example demonstrates the effect of the mixing energy on the average droplet diameter obtained at stage 1 and stage 2 for the production of a bimodal emulsion by the method of the present invention.

Figure 5:
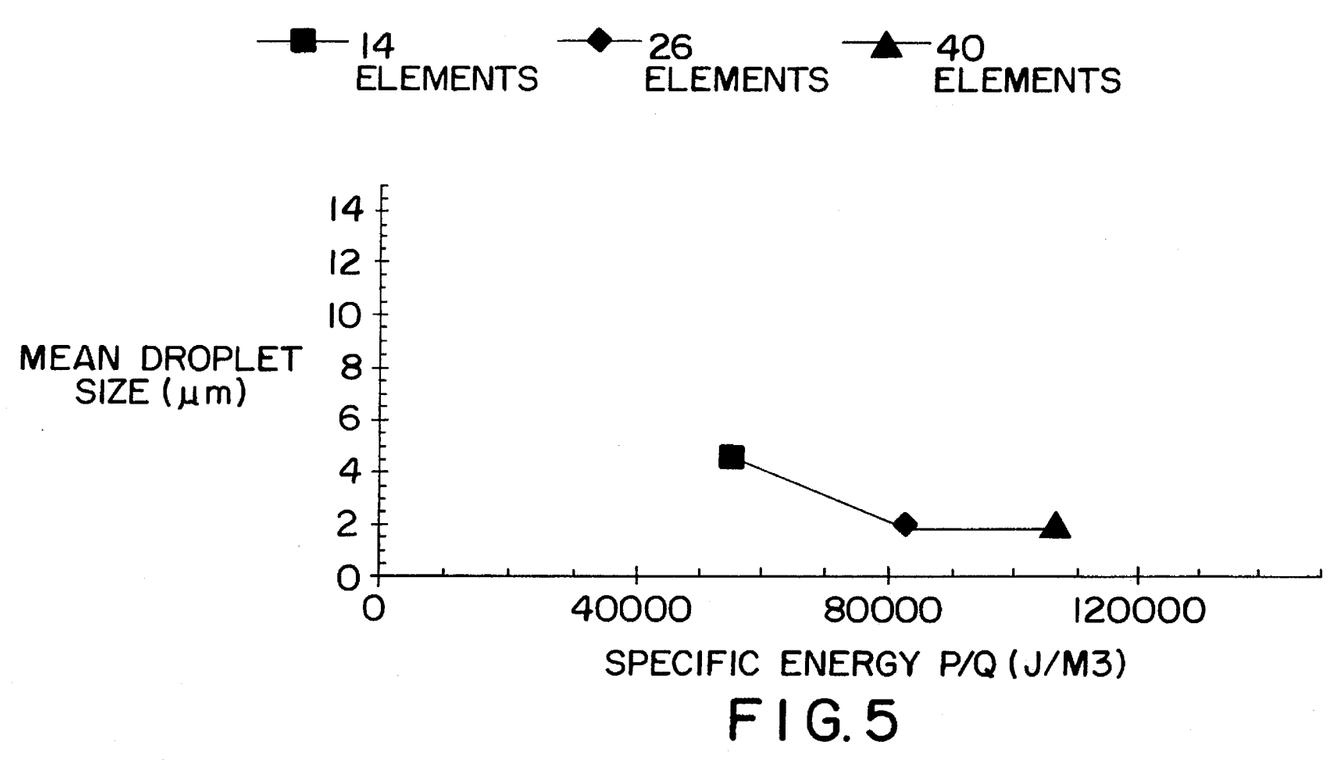
FIG. 5 is a graph illustrating the affect of mixing energy on oil droplet size for a monomodal emulsion made in accordance with the method of the present invention.
Figure 6:
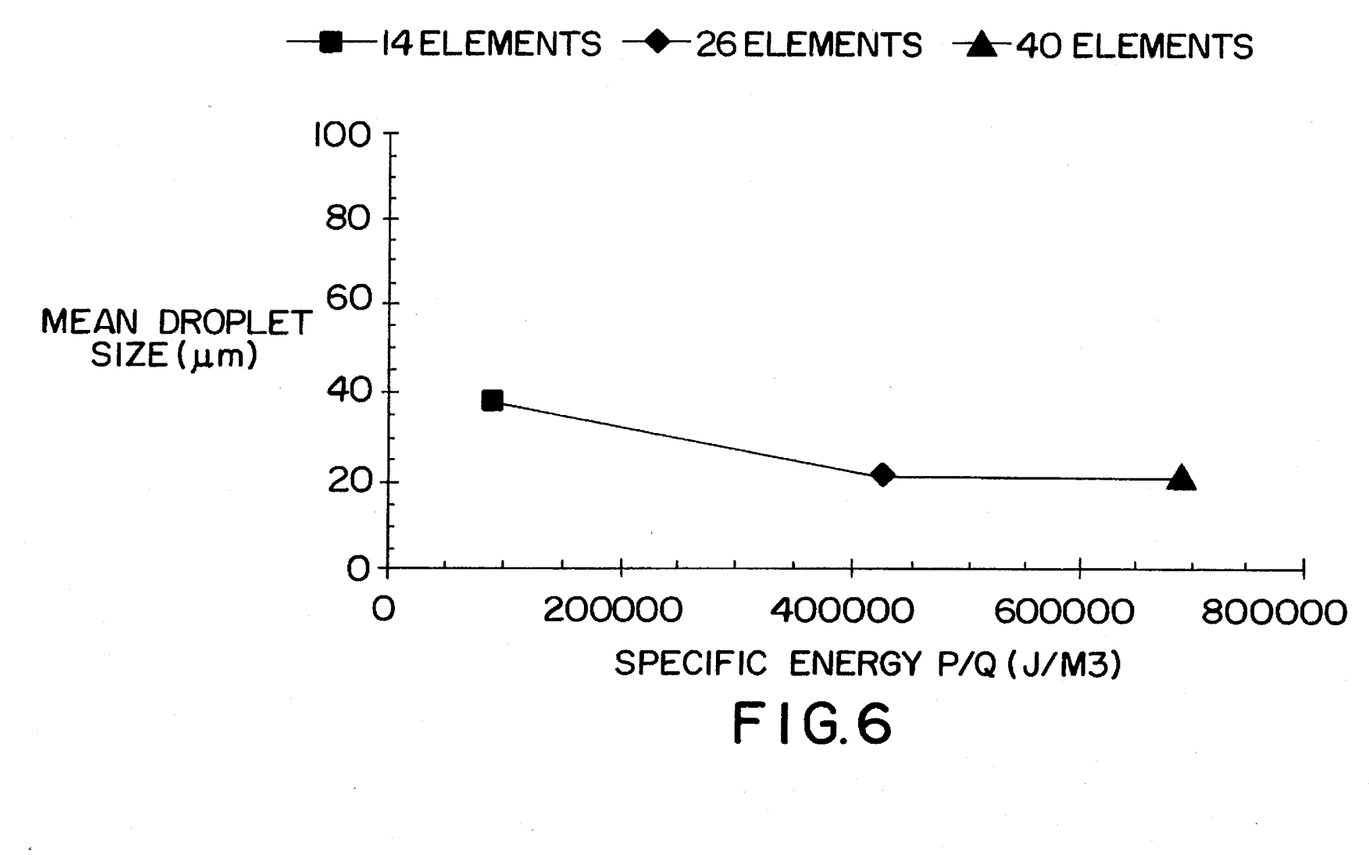
FIG. 6 is a graph illustrating the affect of mixing energy on oil droplet size for a bimodal emulsion made in accordance with the method of the present invention.

The emulsions were prepared as in Example 1 using a Sulzer static mixer Model SMX40 which can be modified with different numbers of mixing elements. The number of mixing elements in the static mixer determine the mixing energy applied. The results can be observed in FIGS. 5 and 6. It can be seen that in stage 1 a static mixer capable of providing about 60,000 $J/m^3$ mixing energy was necessary to obtain an average droplet size below 3 μm. In the second stage less than 300,000 $J/m^3$ mixing energy was needed to obtain a second population with an average droplet diameter below 30 μm.

EXAMPLE 5

This example is included to demonstrate the preparation of a mono-modal emulsion of bitumen in aqueous buffer solution using different amines.

Mono-modal emulsions were prepared as in Example 1. The amine concentration was set at 9,000 ppm, and 400 ppm of NaOH was added to the buffer solution. The pH of the buffer solution was 11. The results are shown in Table III below for different buffer additives.

TABLE III

| Buffer Additive | Average Droplet Diameter (μm) |
| --- | --- |
| Ethylenediamine | 2.8 |
| Ethylamine | 4.2 |
| Propylamine | 3.8 |
| Ethylamine + ethylenediamine (1:1) | 4.1 |

The results show that emulsion with particle sizes of less than or equal to 5 could be obtained with the method of the present invention using different water soluble buffer additives.

EXAMPLE 6

This example demonstrates the effect of different alkali additives on the formation of a mono-modal emulsion.

The procedure described in Example 5 was followed. Different buffer solutions were prepared using 9,000 ppm ethylenediamine, pH 11 and different alkali additives. The results are shown in Table IV.

TABLE IV

| Additive | Concentration (ppm) | Average Droplet Diameter (μm) |
| --- | --- | --- |
| NaCl | 300 | 3.7 |
| KOH | 400 | 3.2 |
| NaOH | 400 | 2.8 |
| Mg (OH)$_2$ + NaOH | 300 + 200 | 3.8 |
| NH$_4$OH | 500 | 4.1 |

The results show that emulsions with particle sizes below or equal to 5 could be obtained with the method of the present invention using different water soluble alkali additives along with the buffer solution.

We claim:

1. A method for forming stable bimodal emulsions of viscous hydrocarbons in aqueous buffer solutions comprising the steps of:

(a) providing a viscous hydrocarbon containing an inactive natural surfactant;

(b) forming an aqueous buffer solution comprising water, an alkali additive in an amount of greater than or equal to about 30 ppm and a water soluble amine buffer additive in an amount of greater than or equal to about 4,000 ppm wherein the pH of the aqueous buffer solution is greater than or equal to about 11;

(c) mixing the viscous hydrocarbon with the aqueous buffer in a ratio of between about 50:50 to 80:20 at a first mixing energy between about 60,000 and 200,000 J/m$^3$ so as to form a mono-modal emulsion of viscous hydrocarbon in aqueous buffer solution having an average hydrocarbon droplet size of less than or equal to about 5 microns whereby the buffer additive extracts the inactive natural surfactant from the viscous hydrocarbon so as to stabilize the emulsion;

(d) adding water to the mono-modal emulsion so as to form a dilute mono-modal emulsion; and (e) mixing additional viscous hydrocarbon with the dilute mono-modal emulsion at a second miming energy between about 80,000 and 1,000,000 J/m$^3$ sufficient to form a stable bi-modal emulsion of viscous hydrocarbon in aqueous buffer solution having the following physical and chemical properties: a hydrocarbon to aqueous buffer solution ratio of between about 60:40 to 80:20; an average small hydrocarbon droplet size (D$_S$) of less than or equal to about 5 microns; and an average large hydrocarbon droplet size (D$_L$) wherein (D$_L$) is greater than (D$_S$) and less than or equal to about 30 microns.

2. A method according to claim 1 wherein the concentration of the buffer is between about 4,000 ppm and about 15,000 ppm.

3. A method according to claim 2 wherein the concentration of the buffer is between about 4,000 ppm and about 10,000 ppm.

4. A method according to claim 1 wherein the water soluble amine has a single alkyl group.

5. A method according to claim 1 wherein the water soluble amine has at least two alkyl groups.

6. A method according to claim 1 wherein the water soluble amine is selected from the group consisting of ethylamine, diethylamine, triethylamine, n-butylamine, tri-isobutylamine, dimethylamine, methylamine, propylamine, dipropylamine, sec-propylamine, butylamine, sec-butylamine, and mixtures thereof.

7. A method according to claim 1 wherein the alkali additive is added to the aqueous buffer solution in an amount of between about 30 ppm to about 500 ppm.

8. A method according to claim 7 wherein the alkali additive is added to the aqueous buffer solution in an amount of between about 30 ppm to about 100 ppm.

9. A method according to claim 1 wherein the alkali additive is selected from the group consisting of water soluble alkali metal salts, alkaline earth metal salts, alkali hydroxides, alkaline earth hydroxides, ammonium salts, alkyl ammonium hydroxides and mixtures thereof.

10. A method according to claim 1 wherein the alkali additive is selected from the group consisting of sodium chloride, potassium chloride, sodium nitrate, potassium nitrate, sodium hydroxide, potassium hydroxide, calcium nitrate, calcium chloride, magnesium chloride, magnesium nitrate, ammonium chloride, ammonium hydroxide, tetrammonium hydroxide, tetrapropylammonium hydroxide and mixtures thereof.

11. A method according to claim 1 wherein the droplet size ratio of D$_L$ to D$_S$ is greater than or equal to about 4.

12. A method according to claim 1 wherein the droplet size ratio of D$_L$ to D$_S$ is greater than or equal to about 10.

13. A method according to claim 1 wherein about 70% to about 90% by weight of the viscous hydrocarbon is contained in the large droplet size D$_L$.

14. A method according to claim 1 wherein the first mixing energy is between about 60,000 and 150,000 J/m$^3$.

15. A method according to claim 14 wherein the second mixing energy required to obtain the bi-modal emulsion with a ratio of D$_L$ to D$_S$ of greater than or equal to about 4 is between about 80,000 and about 800,000 J/m$^3$.

16. A method according to claim 14 wherein the second mixing energy required to obtain a bi-modal emulsion with a D$_L$ particle size of less than or equal to 30 μm is between about 80,000 J/m$^3$ and about 800,000 J/m$^3$.

17. A method according to claim 1 wherein the inactive natural surfactant in the viscous hydrocarbon is selected from the group consisting of carboxylic acids, phenols, esters and mixtures thereof.

18. A method according to claim 1 wherein the viscous hydrocarbon has a total acid number of greater than or equal to 1.

19. A method according to claim 1 where the viscosity of the bimodal emulsion is less than or equal to about 500 cp at 30° C. and 1 S$^{-1}$.

* * * * *